United States Patent Office 2,782,212
Patented Feb. 19, 1957

2,782,212
14-METHYL PREGNENES AND METHOD

Hans Heusser, Oskar Jeger, and Leopold Ruzicka, Zurich, Switzerland, assignors to Ciba Pharmaceutical Products, Inc., Summit, N. J.

No Drawing. Application January 26, 1954,
Serial No. 406,363

Claims priority, application Switzerland January 29, 1953

5 Claims. (Cl. 260—397.45)

This invention relates to 14-methyl steroids which, at least in the 3- and 17-positions, have the same substituents as the known therapeutically active sterioids, and to the manufacture thereof.

In particular, the invention relates to the manufacture of saturated and unsaturated 14-methyl compounds of the androstane and pregnane series that is, the C-19 and C-21 steroids, which in the 3- and 17- or 20-positions have free or functionally converted hydroxyl or oxo groups. They may also be further substituted, especially in the 21- and/or 11-position, by a free or functionally converted hydroxyl or oxo group and also in the 17-position by a free or esterified hydroxyl group or a hydrocarbon radical, e. g. a lower alkyl radical, such as methyl. In the unsaturated compounds the double bond advantageously occupies the 4,5- or 5,6-position and/or the 9,11-position. There are of particular importance, e. g. 14-methyl-testosterone and its esters, 14-methyl-methyltestosterone, 14-methyl-ethinyltesterone, 14-methyl-progesterone, 14-methyl-11-keto-progesterone, 14-methyl-desoxy-corticosterone, 14-methyl-cortisone and 14-methyl-dihydrocortisone.

These new compounds have valuable pharmacological properties and can be used therapeutically in the treatment of various hormone deficiencies, such as androgen, corpus luteum hormone and adrenal cortical hormone insufficiencies. The $\Delta^4$-3,11,20-triketo-14-methyl-pregnene, or 14-methyl-11-keto-progesterone, for instance, has a gestagenic activity.

The new 14-methyl steroids can be made by various methods starting from $\Delta^{3(5)}$-3,14-dimethyl-A-nor-steroids whose ring A may be represented by the following partial formula:

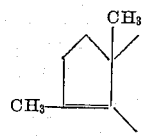

or from $\Delta^{14}$-16-keto-steroids.

According to one embodiment of the invention $\Delta^{3(5)}$-3,14-dimethyl-A-nor-steroids, which in the 17-position carry the same substituent as the therapeutically active steroids or a radical convertible thereinto, are treated with an oxidizing agent, the resulting compounds are cyclicized and any 17-positioned radical, which is convertible as defined above, is so converted.

The starting materials used in this process can be obtained in various ways. Thus, the 3-hydroxy-4,4-dimethyl-grouping present in the tetracyclic triterpenes, e. g. lanosterol and its derivatives degraded in the side chain, can be converted into the $\Delta^{3(5)}$-3-methyl-A-nor-grouping according to the following scheme, the A-ring only being shown for the sake of brevity.

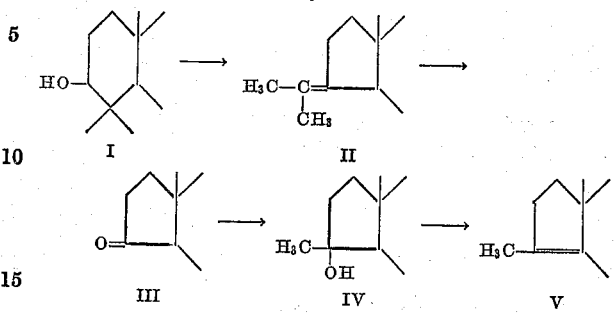

A 3-hydroxy-4,4,14-trimethylsteroid (I) is converted into a 3-isopropylidene-14-methyl-A-nor-steroid (II) by treatment with phosphorus pentachloride. The isopropylidene group is cleaved by oxidation with osmium tetroxide and subsequent treatment with lead tetracetate. The 3-keto-14-methyl-A-nor derivative (III) thus formed is reacted with methyl magnesium iodide to give the 3-hydroxy-3,14-dimethyl-A-nor derivative (IV) which on dehydration yields the $\Delta^{3(5)}$-3,14-dimethyl-A-nor steroid (V).

For the oxidation of the $\Delta^{3(5)}$-3,14-dimethyl-A-nor-steroids there is used e. g. a compound of hexavalent chromium, such as chromic acid, or also permanganate, ozone, peroxides, such as perbenzoic acid, monoperphthalic acid or hydrogen peroxide, advantageously in the presence of osmium tetroxide. Depending on the oxidizing agents used, the 3,5-double bond is split up directly or there are first obtained ozonides, glycols or oxides. The ozonides can be split up hydrolytically, reductively, or oxidatively, while the oxides can be converted into glycols by hydrolysis. The splitting up of these glycols is performed, e. g. by means of chromic acid, lead tetracetate or periodic acid.

For the cyclicization of the resulting 4,5-seco-3,5-diketo-14-methyl-steroids into the $\Delta^4$-3-keto-14-methyl-derivatives, condensing agents, especially alkaline condensing agents, are used. There may be used an alkali hydroxide or alcoholate or an alkaline earth metal hydroxide or alcoholate, for example a hydroxide or alcoholate of sodium, potassium, lithium or calcium, or a strong organic base, such as a secondary or tertiary amine, or a quaternary ammonium hydroxide, e. g. triethylamine or piperidine in the presence of an acid, such as glacial acetic acid or trimethyl benzyl ammonium hydroxide. A solution of the reagents in an anhydrous solvent, such as benzene, alcohol or ether, or an aqueous solution, may be employed in the reaction.

The $\Delta^4$-3-keto-14-methyl-steroids resulting from the cyclicization can be converted e. g. into $\Delta^5$-3-hydroxy-14-methyl-steroids. In the 3-keto- and 3-hydroxy-compounds so obtained, the double bond in 4:5- or 5:6-position can be saturated with hydrogen. These reactions, as also the conversion of substitutents in 17- and/or 11-position, can be carried out in the usual manner.

According to another embodiment of the invention the new compounds can also be obtained from steroids unsubstituted in the 14-position. Particularly suitable as starting materials for this method of carrying out the process are $\Delta^{14}$-16-keto-steroids which may be prepared by brominating 16-keto-steroids and then splitting off hydrogen bromide. The new 14-methyl-steroids are obtained by treating Δ¹⁴-16-keto-steroids which have in the 17-position a like substituent as the therapeutically effective steroids or a substituent convertible into the latter, with methyl metal compounds, for example methyl magnesium iodide, while adding salts, more especially cupro-halides. The 16-keto group can then be removed by known methods, for example by way of the dithio-ketal and catalytic de-sulfurization by means of Raney-nickel or according to the method of Wolff-Kishner or Clemmensen. The resulting 14-methyl-steroids can then be converted in known manner into the therapeutically effective 14-methyl-steroids mentioned hereinabove.

The following examples illustrate the invention. The temperatures are indicated in degrees centigrade.

*Example 1*

A solution of 407 mg. Δ³⁽⁵⁾-3,14-dimethyl-11-keto-20-acetoxy-A-nor-pregnene of the formula

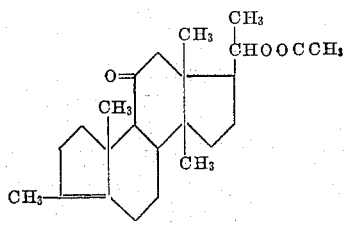

in 20 cc. of pyridine is admixed with 300 mg. of osmium tetroxide and allowed to stand at room temperature for 5 days. The solution is then evaporated to dryness, the residue mixed with a mixture of 10 cc. of benzene, 20 cc. of ethanol, 5 cc. of water, 2 gm. of mannitol and 1 gm. of potassium hydroxide and the whole is boiled under reflux for several hours. After cooling, water is admixed, the whole extracted with ether, the ethereal extract washed with water, dried and evaporated. The glycol obtained is oxidized in a mixture of 10 cc. of chloroform and 10 cc. of glacial acetic acid at room temperature with 1.3 gm. of lead tetracetate. The oxidation product isolated by extraction with ether is then dissolved in 35 cc. of dioxane and vigorously shaken with a solution of 3.5 gm. of potassium hydroxide in 35 cc. of water for 1 hour at room temperature. The reaction product is isolated by the addition of water and extraction with ether. 100 mg. of the Δ⁴-3,11-diketo-14-methyl-20-hydroxy-pregnene obtained are then treated with 50 mg. of chromic acid in 95% acetic acid. After the addition of aqueous sodium sulfite solution, the reaction mixture is extracted with ether and the ethereal solution washed, dried and evaporated. The crude product thus obtained is purified by chromatography over 10 gm. of aluminum oxide. Elution with a mixture of petroleum ether and benzene gives the 14-methyl-11-keto-progesterone of the formula

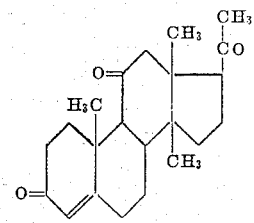

which, after recrystallization from methanol, melts at 233–235°; $[\alpha]_D = +302°$ (c=1.30 in chloroform).

The Δ³⁽⁵⁾-3,14-dimethyl-11-keto-20-acetoxy-A-nor-pregnene used as starting material can be obtained as follows:

4,4,14-trimethyl-3-hydroxy-11,20-diketo-pregnane obtainable from lanosterol by the process described in U. S. application Serial No. 282,278, filed April 14, 1952, by Oskar Jeger et al. is converted into 3-isopropylidene-14-methyl-11,20-diketo-A-nor-pregnane of the formula

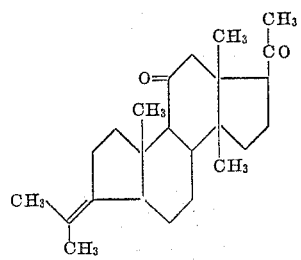

by treating a suspension of 8.4 gm. of the above named starting material in a mixture of 840 cc. of benzene and 840 cc. of petroleum ether with 7.1 gm. of phosphorus pentachloride in an atmosphere of dry nitrogen. The substance dissolves within 10 minutes with evolution of hydrogenchloride. After 90 minutes the evolution of gas ceases. Water is added and the reaction mixture is stirred for one hour. The organic phase is washed neutral, dried and chromatographed over 85 gm. of aluminum oxide. Elution with a mixture of petroleum ether and benzene gives 5.5 gm. of 3-isopropylidene-14-methyl-11,20-diketo-A-nor-pregnane which, after recrystallization from methanol, melts at 143–145°, $[\alpha]_D = 102$ (c=0.71 chloroform).

For the reduction of the keto groups in positions 11 and 20 a solution of 3 gm. of the above substance in 90 cc. of benzene is treated with a slurry of 3 gm. of lithium aluminum hydride in 60 cc. of ether. The reaction mixture is worked up in the usual manner and the crude product is acetylated by treatment with 30 cc. of acetic anhydride in 30 cc. of pyridine. The mixture of 3-isopropylidene-14-methyl-11β-hydroxy-20-acetoxy-A-nor-pregnanes of the formula

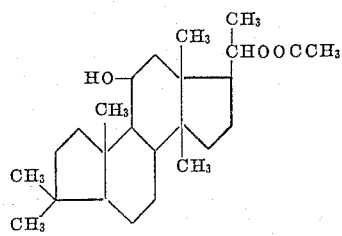

isomeric at the carbon atom 20, can be separated by fractional crystallization from a mixture of methylene chloride and methanol. The isomers melt at 241–244° C. or 182–184° respectively, $[\alpha]_D = +35°$ (c=1.03 in chloroform) or $[\alpha]_D = +40°$ (c=1.12 in chloroform). It is, however, advantageous not to separate the isomers at this stage.

The replacement of the 3-isopropylidene group by an oxo group is carried out as follows:

To a solution of 1.85 gm. of the above mixture of isomers in 60 cc. of dry pyridine are added 1.3 gm. of osmium tetroxide and the mixture is allowed to stand at room temperature for 4 days. After evaporation of the solvent the residue is dissolved in 40 cc. of benzene and 40 cc. of ethanol, mixed with a solution of 8 gm. of mannitol and 8 gm. of potassium hydroxide in 20 cc. of water and 40 cc. of ethanol and the whole is boiled under reflux for 6 hours. The reaction mixture is worked up in the usual manner by extraction with ether. The crude glycol obtained is mixed with 20 cc. of acetic acid, 10 cc. of chloroform, 20 cc. of water and 3 gm. of lead tetra acetate and allowed to stand for 15 hours at room temperature. After reacetylation of the 17-hydroxyl group of the isolated oxidation product by treatment with 15 ml. of acetic anhydride and 15 ml. of pyridine there is obtained the mixture of 14-methyl-3-keto- 11β-hydroxy-20-acetoxy-A-nor-pregnanes, isomeric at the carbon 20 of the formula

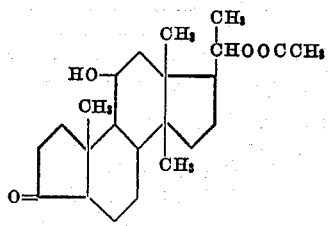

The crude substance is suitable for the subsequent reactions without further purification.

The 3-ketone as obtained above is dissolved in 100 cc. of dry benzene and the solution is added dropwise to a stirred Grignard solution prepared from 3.4 gm. of magnesium and 20 g. of methyl iodide in 200 ml. of dry ether. After distillation of 100 ml. of the solvent and replacement by 100 ml. of dry benzene the mixture is refluxed for 6 hours. The product isolated in the usual manner is treated once more with methyl magnesium iodide as described above in order to transform any unreacted 3-ketone into the carbinol. The reaction product is reacetylated by treatment with a mixture of 15 cc. of acetic anhydride and 15 cc. of pyridine. In order to oxidize the hydroxyl group in position 11 the crude acetate is dissolved in 25 cc. of methylene chloride and 75 cc. of glacial acetic acid and allowed to stand for 3.5 hours with a solution of 1 gm. of chromic acid in 90% acetic acid. The reaction mixture is worked up in the usual manner to give 3,14-dimethyl-11-keto-3-hydroxy-20-acetoxy-A-nor-pregnane of the formula

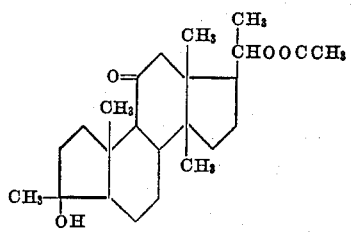

For the dehydration of the 3-carbinol grouping the crude compound as obtained above is dissolved in 60 cc. of dry xylene and refluxed for 5 hours with 5 gm. of fuller's earth (activated by heating at 320–330° C. for 3 hours at 12 mm. pressure). After filtration and removal of the solvent by evaporation there are obtained 1.6 g. of a crude product which was chromatographed over 50 g. of aluminum oxide. Elution with a mixture of petroleum ether and benzene (4:1) gives 600 mg. of $\Delta^{3(5)}$-3,14-dimethyl-11-keto-20-acetoxy-A-nor-pregnene melting at 206–208° after recrystallization from methanol, $[\alpha]_D = +126°$ (c=1.08).

*Example 2*

A solution of 20 mg. of 14-methyl-11-keto-progesterone in 10 cc. of ethylacetate is shaken with 20 mg. of palladium-bariumsulfate catalyst for 3 hours in a hydrogen atmosphere at room temperature. After removal of the catalyst and evaporation of the solvent the 14-methyl-3,11,20-triketo-pregnane is obtained which shows no absorption in the U. V. spectrum at 240 mμ.

*Example 3*

4.177 grams of $\Delta^{14}$-3β:17β-diacetoxy-16-keto-androstene melting at 144–145° and having the specific rotation $[\alpha]_D = +52°$ in chloroform and an absorption maximum at 236 mμ (log ε=4.23) are dissolved in 190 cc. of absolute ether and introduced dropwise within 3 hours at —12 to —15° while mixing vigorously into a Grignard solution prepared from 8.9 grams of magnesium shavings, 40 grams of methyl iodide and 200 cc. of ether and to which 0.5 gram of cuprous chloride have been added. After a further hour the external cooling is removed and the reaction solution brought to a temperature of 20° C. The mixture is worked up by cautiously adding a solution of saturated aqueous ammonium chloride at —12° C. The organic portions are extracted in the usual manner with ether and the ether solution washed, dried and evaporated. The crude product has a maximum at 238 mμ (log ε=3.39) in the UV-absorption spectrum, corresponding to a content of 15 percent of the starting material. From this crude product there may be obtained by repeated chromographic purification the 14-methyl-3β:17β-diacetoxy-16-keto-androstane melting at 215–217° C. ($[\alpha]_D = +85°$ in chloroform) in a pure form. The compound exhibits in the IR-absorption spectrum a characteristic absorption of the 5-membered, saturated ring ketone at 1751 cm.$^{-1}$ in addition to the band of the acetoxy residues at 1723 cm.$^{-1}$.

To remove the keto group in the 16-position the 14-methyl-3β:17β-diacetoxy-16-keto-androstane (118 mg.) is dissolved in 3.5 cc. of dithioglycol, and dry hydrochloric acid gas is introduced at 0° C. for one hour. The excess dithioglycol is then evaporated in vacuo and the crude ethylene dithioketal of the 14-methyl-3β-17β-diacetoxy-16-keto-androstane is heated in 20 cc. of absolute dioxane with 5 grams of freshly prepared Raney-nickel for 3 hours at the boil for the purpose of de-sulfurization. The solution is filtered off from the catalyst, the latter is well washed with benzene and the filtrate evaporated to dryness. After reacetylation in the usual manner the crude product thus obtained is purified by chromatography over aluminum oxide. The fractions eluted by mixture of petroleum ether and benzene (9:1)-yield the 14-methyl-3β:17β-diacetoxy-androstane of the formula

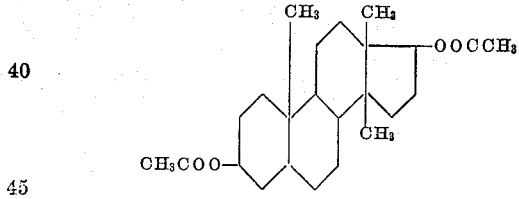

When recrystallized from a mixture of ether and petroleum ether the compound melts at 157–158° C. and has a specific rotation ($[\alpha]_D = +2.4°$ in chloroform).

From the chromatographic fractions eluted with petroleum ether 14-methyl-3β-acetoxy-androstane, melting point 116–117°, is obtained as a by-product.

The $\Delta^{14}$-3β:17β-diacetoxy-16-keto-androstene used as starting material for the synthesis of 14-methyl-3β:17β-diacetoxy-androstane is prepared from 3β:17β-diacetoxy-16-keto-androstane by bromination in a solution of glacial acetic acid at 50–60° C. and then splitting off the hydrogen bromide from the resulting bromination product by heating with collidine.

What is claimed is:

1. A process of preparing 14-methyl substituted steroids which comprises treating a member selected from the group consisting of a $\Delta^{14}$-3,20-dioxygenated-16-keto-pregnene and a $\Delta^{14}$-3,17-dioxygenated-16-keto-androstene with a methyl magnesium halide in the presence of a cupro-halide and then reducing the 16-carbonyl group to a methylene group.

2. A process of preparing 14-methyl substituted steroids which comprises treating a $\Delta^{14}$-3,17-diacyloxy-16-keto-androstene with a methyl magnesium halide in the presence of a cupro-halide and then converting the 16-keto group into a thioketal and treating the latter with a nickel catalyst.

3. 14-methyl-11-keto-progesterone.

4. $\Delta^{4}$-3,11-diketo-14-methyl-20-hydroxy-pregnene.

5. Compounds of the formula

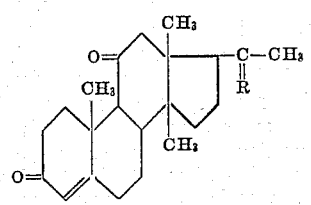

in which R represents a member of the group consisting of O and

References Cited in the file of this patent
UNITED STATES PATENTS

| | | |
|---|---|---|
| 2,249,748 | Dane | July 22, 1941 |
| 2,292,080 | Marker | Aug. 4, 1942 |
| 2,403,683 | Reichstein | July 9, 1946 |

OTHER REFERENCES

Reichstein: Helv. Chim. Acta 23, 684–688 (1940).
Marker: Jour. Am. Chem. Soc. 64, 1280–1281 (1942).
Minlon: Chem. Abst. 37, col. 1757 (1943).
Julian: Jour. Am. Chem. Soc. 70, 3872–3875 (1948).
Nazarov: Chem. Abst. 45, col. 7583 (1951).
McGhie: Chemistry and Industry, 1951, pp. 1165–1166.
Voser: Helv. Chim. Acta 35, 66–75 and 503–510 (1952).